(12) United States Patent
Davis

(10) Patent No.: US 8,191,932 B2
(45) Date of Patent: Jun. 5, 2012

(54) FLUID COUPLING AND METHOD FOR ASSEMBLING SAME

(75) Inventor: Thomas Anthony Davis, Charlotte, NC (US)

(73) Assignee: Dixon Quick Coupling, Charlotte, NC (US)

( * ) Notice: Subject to any disclaimer, the term of this patent is extended or adjusted under 35 U.S.C. 154(b) by 316 days.

(21) Appl. No.: 12/357,799

(22) Filed: Jan. 22, 2009

(65) Prior Publication Data
US 2010/0183361 A1 Jul. 22, 2010

(51) Int. Cl.
*F16L 37/00* (2006.01)
(52) U.S. Cl. .............. 285/316; 285/277; 137/614.05
(58) Field of Classification Search .......... 285/277, 285/276, 316; 137/614.02, 614.05, 614.04, 137/515
See application file for complete search history.

(56) References Cited

U.S. PATENT DOCUMENTS

| | | | |
|---|---|---|---|
| 2,553,021 A * | 5/1951 | Von Adelung | 285/277 |
| 2,665,928 A * | 1/1954 | Omon et al. | 137/614.04 |
| 2,761,469 A * | 9/1956 | Hansen | 137/614.05 |
| 2,868,563 A * | 1/1959 | Wood | 137/614.04 |
| 3,052,261 A * | 9/1962 | Nyberg | 137/614.05 |
| 3,199,831 A | 8/1965 | Sully | |
| 3,537,478 A * | 11/1970 | Evans et al. | 137/614.04 |
| 4,182,370 A * | 1/1980 | Karcher | 137/614.04 |
| 4,327,770 A * | 5/1982 | Brown et al. | 137/614.05 |
| 4,398,561 A | 8/1983 | Maldavs | |
| 4,932,431 A | 6/1990 | Silagy | |
| 4,953,592 A * | 9/1990 | Takahashi et al. | 137/614.04 |
| 5,027,845 A | 7/1991 | Silagy | |
| 5,248,125 A * | 9/1993 | Fritch et al. | 137/614.02 |
| 5,255,699 A | 10/1993 | Herzan et al. | |
| 5,255,714 A | 10/1993 | Mullins | |
| 5,290,009 A * | 3/1994 | Heilmann | 285/316 |
| 5,445,358 A | 8/1995 | Anderson | |
| 5,540,250 A | 7/1996 | Mullins | |
| 6,158,717 A | 12/2000 | Van Scyoc et al. | |
| 6,354,564 B1 * | 3/2002 | Van Scyoc et al. | 137/614.05 |
| 6,890,004 B2 * | 5/2005 | Naito | 285/316 |
| 7,111,819 B2 | 9/2006 | Mikiya et al. | |
| 7,121,592 B2 * | 10/2006 | Sazbo et al. | 137/614.02 |
| 7,168,449 B2 * | 1/2007 | Giagnoli et al. | 137/614.04 |
| 7,293,758 B2 | 11/2007 | Hsueh-Feng | |
| 7,311,231 B2 | 12/2007 | Noell et al. | |
| 2002/0079473 A1 | 6/2002 | Jeory | |
| 2005/0242315 A1 | 11/2005 | Lund | |

* cited by examiner

*Primary Examiner* — David E Bochna
(74) *Attorney, Agent, or Firm* — Alston & Bird LLP

(57) ABSTRACT

A coupling for liquid and gas applications has a valve cartridge loaded from a front end of the coupling. The valve cartridge includes a valve body, a valve member, and a valve spring. The valve member is within the valve body and the valve spring coaxially surrounds the valve member and is disposed between the valve body and the valve member. An aperture in the valve body allows the valve member to pass through the valve body. A stop ring is disposed between the valve cartridge and the front-end portion to secure the valve cartridge in the valve cavity. The valve cartridge is secured in a valve cavity of the coupling by the stop ring. The valve member includes a valve that is opened when a mating coupling is inserted into the coupling. The valve also operates to shut off the flow when the couplings are disconnected.

17 Claims, 5 Drawing Sheets

FLUID COUPLING AND METHOD FOR ASSEMBLING SAME

BACKGROUND OF THE INVENTION

Disconnect couplings are frequently used in a variety of fluid transfer systems, including both high pressure and low pressure systems and gas and liquid systems for quickly and relatively conveniently connecting and disconnecting the fluid-flow supply and discharge lines. Many of these couplings are equipped with quick-disconnect or quick-action features and automatic means to shut off the flow of liquid when the mating parts of the coupling are disconnected.

Quick-action couplings typically comprise two primary components, or members: a generally cylindrical socket having an axial fluid-flow pathway and configured to be attached to one line, and a generally cylindrical plug also having an axial fluid-flow pathway and configured to be attached to another line. The plug is inserted into the socket to join the two lines and to create a single fluid-flow pathway between the lines. Generally speaking, the socket has a plurality of evenly spaced locking balls contained in apertures arranged in a circle around the receiving end of the socket. A spring biased detent sleeve circumscribing the socket holds the locking balls radially inwardly. To insert the plug into the socket, the operator first uses one hand to pull the detent sleeve longitudinally away from the plug receiving end of the socket so that the balls are released. Using the other hand, the operator inserts the plug into the socket. The plug has an annular groove, or race, for receiving the locking balls. The operator then releases the detent sleeve, which holds the balls in the annular groove and the plug, and secures the plug in the socket. The operator removes the plug from the socket in an analogous fashion. Additionally, push-to-connect, or automatic, couplings exist that do not require the operator to pull and release a detent sleeve. In operation, the detent sleeve of an automatic coupling is configured to retract upon inserting a plug into a socket.

Valves are typically included in the fluid flow passageway to urge the plug out of coaxial coupled relation and stop the fluid flow when the plug and socket are released from coaxial coupled relation. Conventional valves typically are fixedly mounted on a valve member. The valve member is mounted in a valve body, also called a spider, which is located within a valve cavity along a flow pathway. The valve body acts to axially locate the valve member and valve within the coupling member. A coil spring, or valve spring, is generally mounted over the valve member and urges on one end against the valve body and on the other end against the valve member to urge the valve into contact with a seat within the coupling member to shut off flow. When the coupling members are joined, the valve is typically urged against the bias of the spring and away from the seat to provide a fluid-flow pathway around the valve.

Assembly of the valve into the socket is often difficult given the number of components needed to be positioned precisely and accurately in a relatively small space. Varying operating conditions for the valves necessitate different valve designs often requiring sockets configured for each different valve design. As a result, the valves add complexity to socket design and require a considerable amount of assembly, thereby increasing the production costs of the socket. Thus, it is desirable to have a variety of valve components that are easy to assemble and that can be incorporated into a single socket design.

It is also desirable to have a valve design that can form a seal quickly after the plug has been removed from the socket and a design that reduces the possibility of having the valve become misaligned or wedged in the valve member thereby preventing the valve from closing. Further, certain fluid transfer systems utilize fluids stored and transferred through lines under high pressures requiring a valve design capable of maintaining a seal and reducing the possibility of a valve being dislodged from a valve cavity of the socket. Such features are also desirable to prevent leakage into the surrounding environment.

Accordingly, there is a need for an improved valve design and assembly process to reduce the cost of assembling valves in sockets of fluid transfer systems and to provide for a valve that resists being dislodged from the socket due to high pressure from the fluid and to quickly and consistently form a reliable seal.

BRIEF SUMMARY OF THE DISCLOSURE

The present disclosure addresses the above needs and achieves other advantages, by providing a front-loaded valve cartridge that is easy to assemble, has desirable sealing characteristics and can withstand high pressures. In accordance with one embodiment, a generally cylindrical socket with an axial fluid-flow pathway is provided having a front-end portion, for releasably engaging a mating member, and a rear-end portion. A valve cartridge is mounted in a valve cavity from the front-end portion of the socket and along the fluid-flow pathway. The valve cartridge comprises a valve body, a valve member, and a valve spring, with the valve being operable to control an aperture along said fluid-flow pathway. The valve member is coaxially disposed within the valve body and the valve spring coaxially surrounds the valve member and is disposed between the valve body and the valve member. The valve body includes the aperture, which is configured to allow the valve member to slidably pass through the aperture. A stop ring, preferably made of nitrite rubber, in the valve cavity is disposed between the valve cartridge and the front-end portion to secure the valve cartridge in the valve cavity. The stop ring can also form a seat for the valve member.

In some other embodiments, the valve member includes a forward end proximate the stop ring and an opposite rear end including a distinct valve component. In operation, the valve is urged against the valve body by the valve spring to close the fluid-flow pathway and the valve opens the fluid-flow pathway in response to pressure from the mating member against the forward end of the valve member. The valve may include an o-ring in a circumferential groove of the valve to prevent leakage between the valve member and the valve body when the fluid-flow pathway is closed.

The valve cavity may also include a retaining ring disposed between the stop ring and the front-end portion to maintain the position and orientation of the stop ring. Further, a snap ring may be disposed between the retaining ring and the front-end portion to secure the valve cartridge, stop ring, and retaining ring in the valve cavity. Together, the valve cartridge, stop ring, retaining ring, and snap ring are configured to withstand at least 3,000 psi of pressure. To facilitate connecting a line to the socket, a rear-end portion of the socket may include a hex fitting.

In accordance with another embodiment, a first coupling member includes a tubular body with an axial fluid-flow pathway, a rear end for connecting a fluid-conducting line, and an opposite forward end for connecting a second coupling member. The first coupling member is designed to allow a forward end of the second coupling member to be axially inserted into the forward end of the first coupling member for establishing a continuous fluid flow path between the two coupling members. The first coupling member includes a valve assembly having a valve body, a valve member, and a valve spring configured as a unit to be inserted into the forward end of the first coupling member. Within the valve assembly, the valve member is coaxially disposed within the valve body and the valve spring coaxially surrounds the valve member and is positioned between the valve body and the valve member.

An aperture is included in the valve body to allow the valve member to slidably pass through the aperture. In operation, the valve member is moved axially upon insertion of the second coupling member into the first coupling member to open the fluid-flow pathway. Within the valve cavity, a stop ring, preferably made of nitrile rubber, is positioned within a circumferential groove defined on an inner surface of the valve cavity. In this position, the stop ring can secure the valve assembly in the valve cavity and limit the movement of the valve member towards the forward end of the first coupling member. A hexagonal outer surface of the rear end of the first coupling member may be included to facilitate connecting the fluid-conducting line to the rear end of the first coupling member.

In accordance with yet another embodiment, the process of assembling a fluid coupling for fluid-conducting lines comprises inserting a valve cartridge into a valve cavity from a front-end portion of a socket, the valve cartridge being operable to control an aperture along a fluid-flow pathway. The valve cartridge may be preassembled to include a valve body, a valve member, and a valve spring. In assembling the valve cartridge, the valve member is coaxially positioned within the valve body, the valve spring coaxially surrounds the valve member and is disposed between the valve body and the valve member.

Assembly of the socket also includes inserting a stop ring into a circumferential groove of the valve cavity such that the stop ring is positioned between the valve cartridge and the front-end portion of the socket. A retaining ring is inserted between the stop ring and the front-end portion of the socket to maintain the orientation of the stop ring. Also a snap ring may be positioned between the retaining ring and the front-end portion of the socket to secure the valve cartridge, stop ring, and retaining ring in the valve cavity.

The assembly process may also include positioning an o-ring in a circumferential groove on the valve for precluding leakage between the valve member and the valve body when the fluid-flow pathway is closed. Further, assembly of the socket may include attachment of a supply line via use of a hex fitting on the rear-end portion of the socket.

BRIEF DESCRIPTION OF THE SEVERAL VIEWS OF THE DRAWINGS

Figure 1:
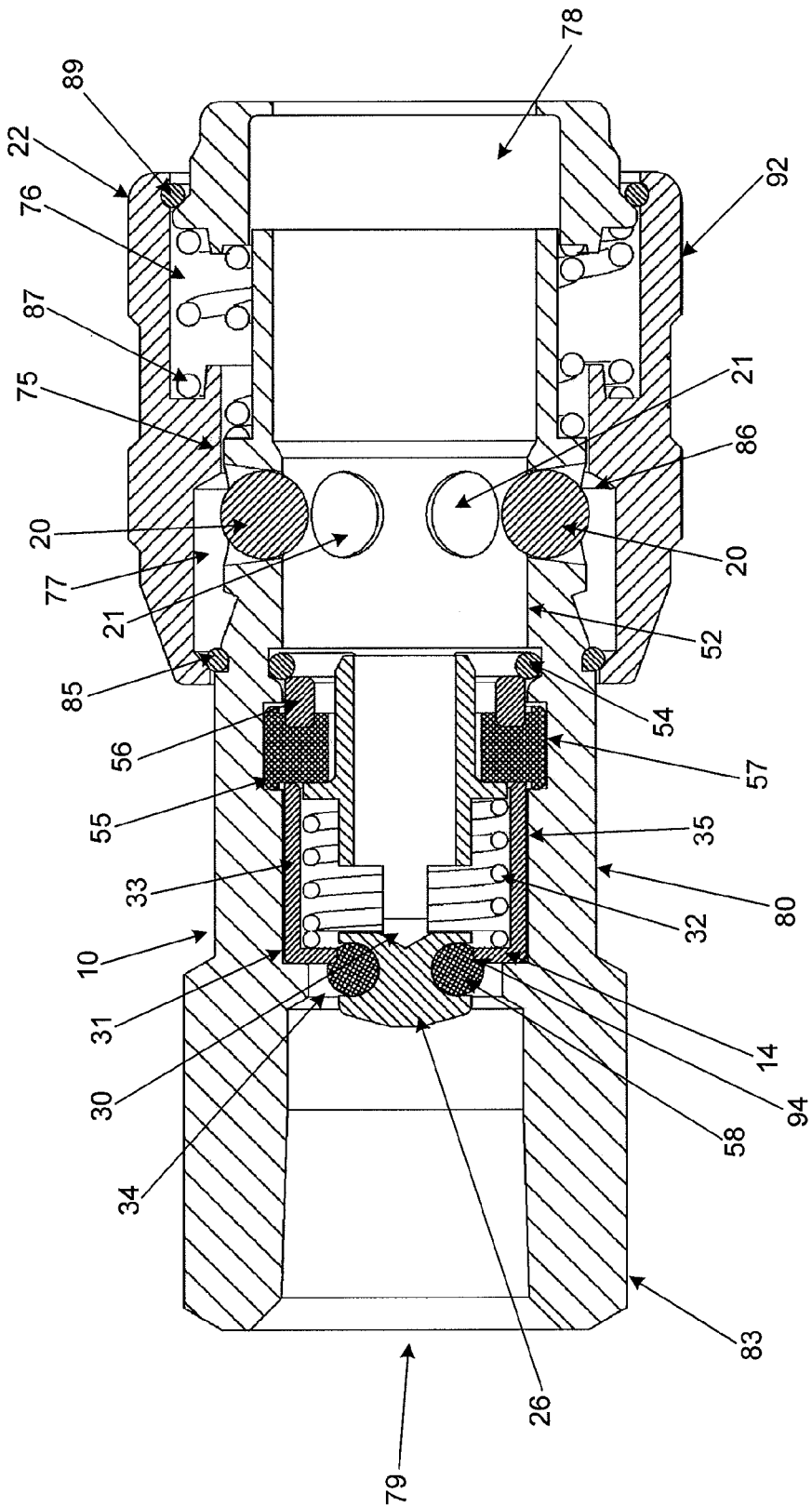

Having thus described the disclosure in general terms, reference will now be made to the accompanying drawings, which are not necessarily drawn to scale, and wherein:

FIG. 1 illustrates a cross-sectional view of a socket for a fluid transfer system in accordance with one embodiment wherein a valve is located within the socket.

Figure 2:
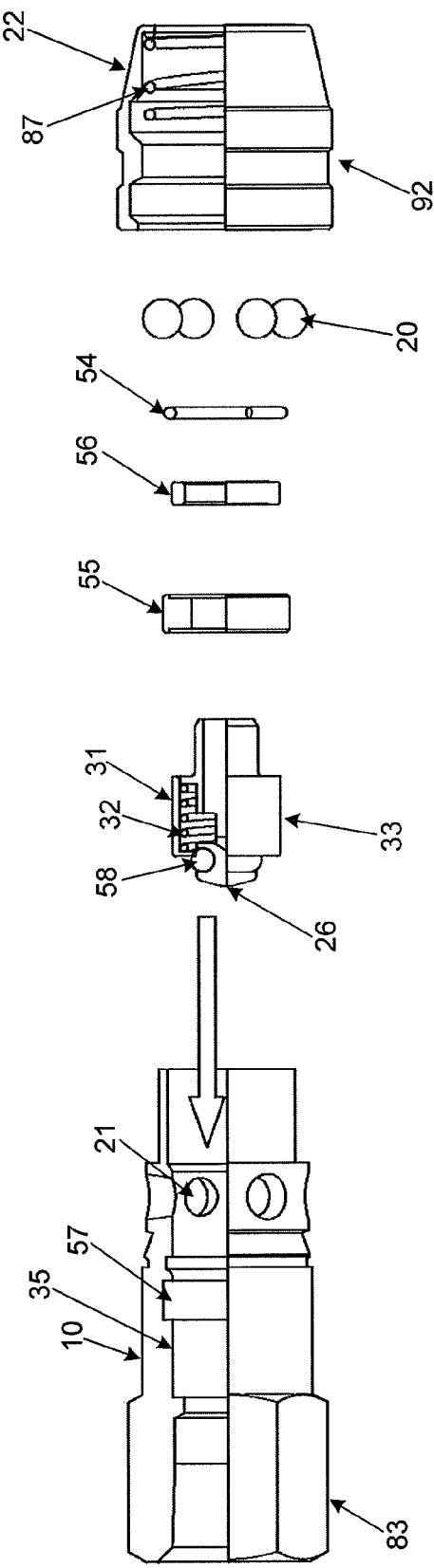

FIG. 2 illustrates an exploded partial cross-sectional view of the socket of FIG. 1 in a disassembled state.

Figure 3:
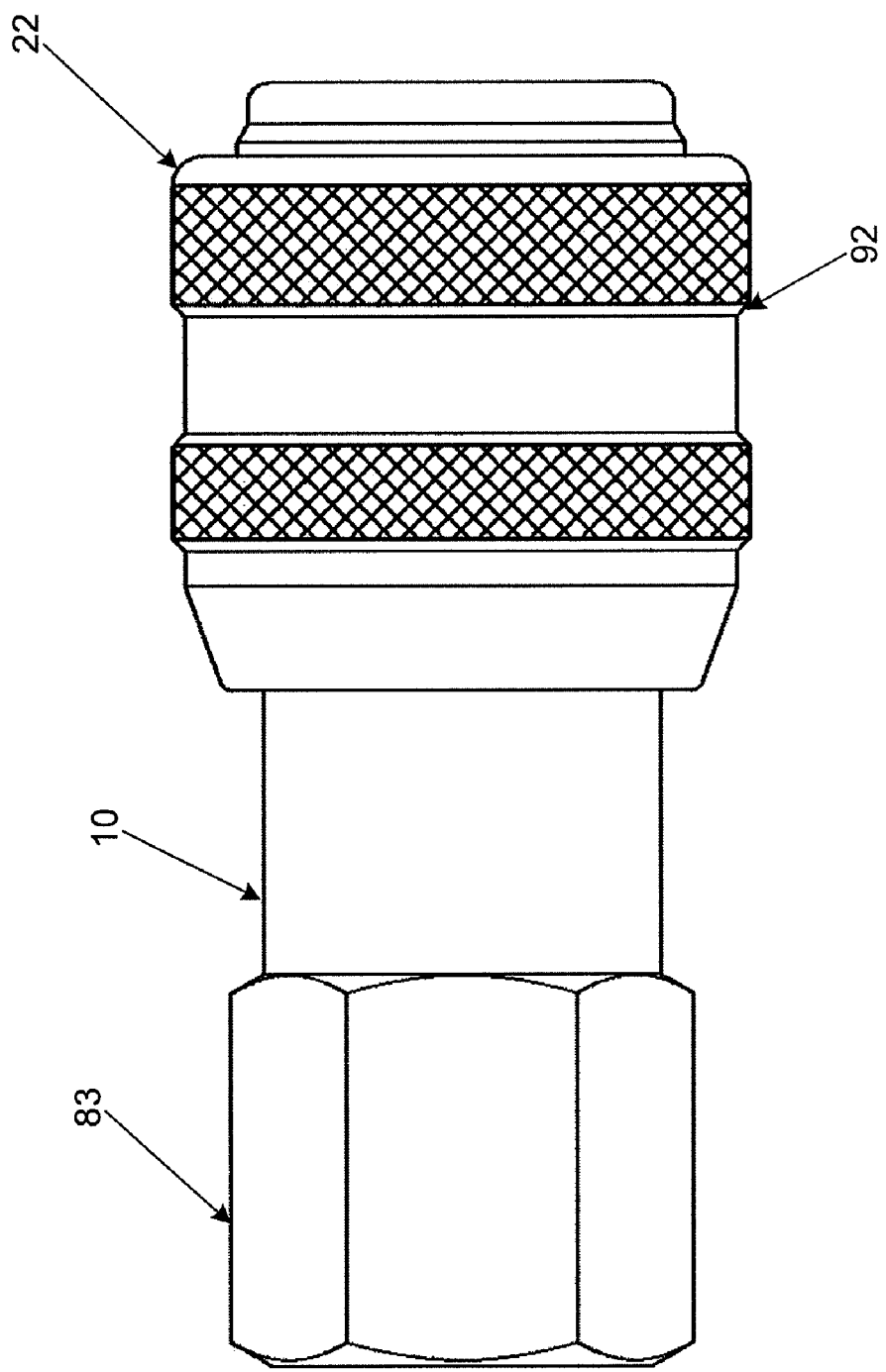

FIG. 3 illustrates the socket of FIG. 1 in an assembled state.

Figure 4:
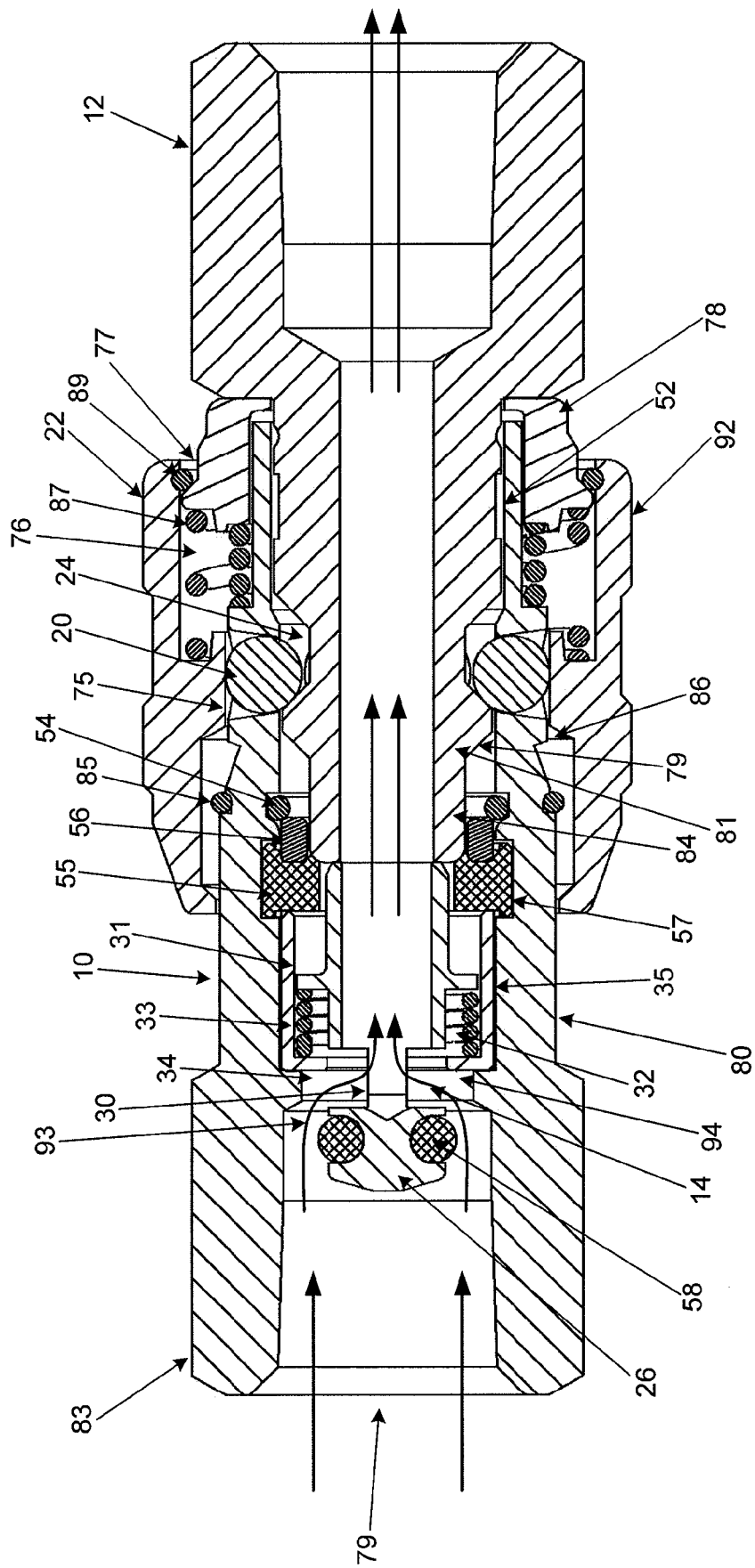

FIG. 4 illustrates a cross-sectional view of a plug inserted into the socket of FIG. 1, the socket and plug being in coaxial coupled relation and showing the valve in an open position.

Figure 5:
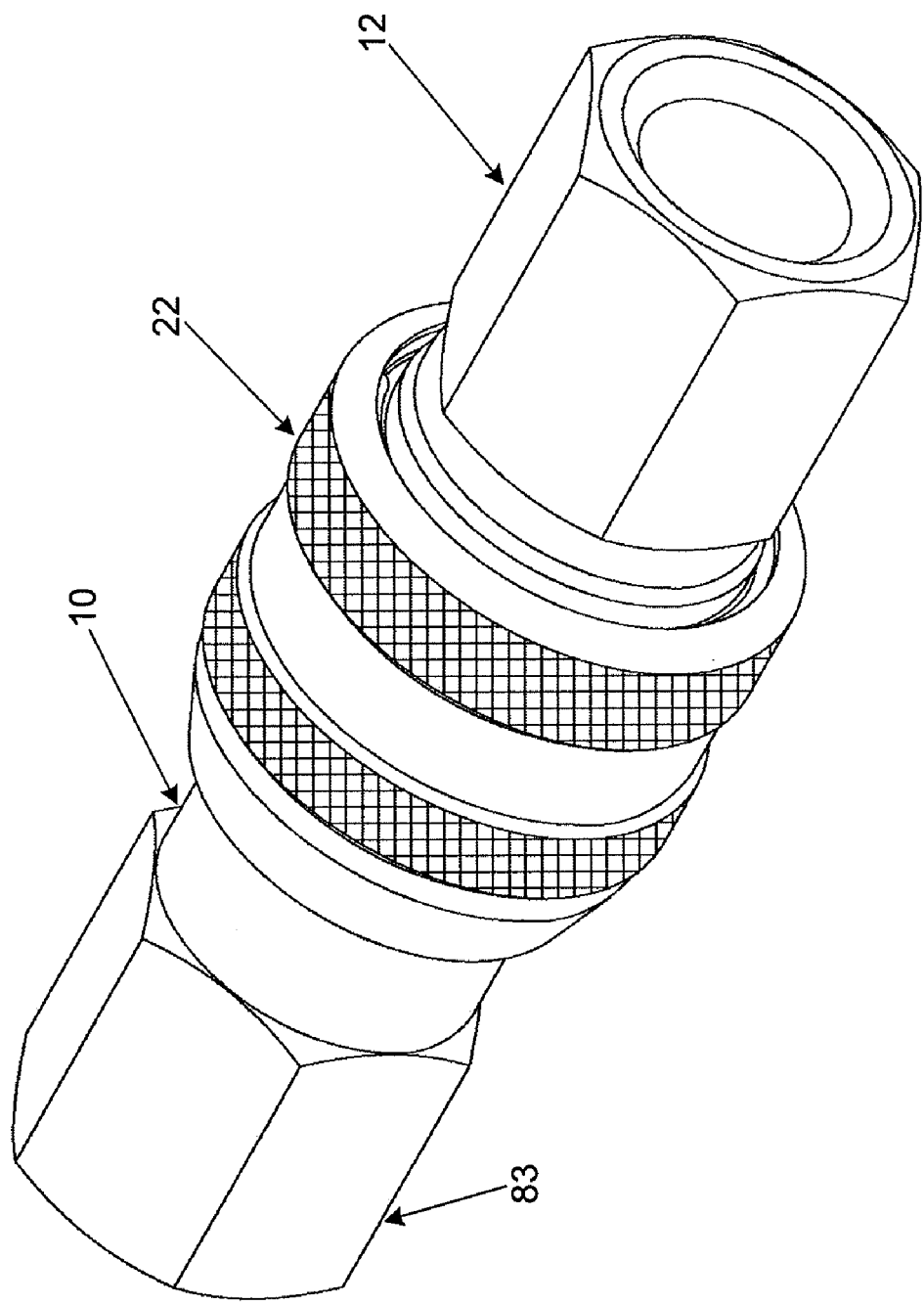

FIG. 5 illustrates the socket and plug of FIG. 4 in coaxial coupled relation.

DETAILED DESCRIPTION OF THE DRAWINGS

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As an initial overview of preferred embodiments of the invention, a fluid coupling for liquid and gas applications has a valve cartridge 31 loaded from a front end 78 of the coupling or socket 10. Components making up the valve cartridge 31 are a valve body 33, a valve member 30, and a valve or member spring 32. The valve member 30 is coaxially disposed within the valve body 33 and the stem spring 32 coaxially surrounds the valve member 30 and is disposed between the valve body 33 and the valve member 30. An aperture 94 is included in the valve body 33 to allow the valve member 30 to pass through the aperture 94. A stop ring 55 in the valve cavity 35 disposed between the valve cartridge 31 and the front-end portion 78 to secure the valve cartridge 31 in the valve cavity 35. The valve cartridge 31 is secured in a valve cavity 35 of the coupling 10 by the stop ring 55. A valve 26, which is part of the valve member 30 of the valve cartridge 31, is urged into an open state when a mating coupling or plug 12 is inserted into the front end 78 of the socket 10. The valve 26 also operates to shut off the flow when the mated couplings are disconnected or when flow through the socket 10 is shut off.

FIG. 1 illustrates a cylindrical socket 10 according to an embodiment of the present invention. The socket 10 includes a single-piece body 80 that is tubular and forms the main structural member of the socket 10. The single-piece body 10 defines a rear-end portion 79 with a hex-fitting 83 to facilitate attachment of a supply line (not illustrated). The body also includes a front coupling-end portion 78. Disposed between the hex-fitting 83 and the front-end portion 78, and within the body 80, is a valve cavity 35.

Within the valve cavity 35 is a valve cartridge 31 comprised of a number of components. Specifically, the valve cartridge 31 is comprised of a valve body 33, a valve member 30 and a stem spring 32. The valve member 30 is positioned coaxially within the valve body 33 and substantially in alignment with an aperture 94 on a rear surface of the valve body 33 adjacent to the rear-end portion 79 of the socket 10. The valve spring 32 is disposed coaxially and surrounding the valve member 30 such that the valve spring 32 is positioned between the valve body 33 and the valve member 30. The valve member 30 includes an integral valve 26 proximate the end of the valve member 30 nearest the rear-end potion 79 with an o-ring 58 positioned within a circumferential groove of the valve 26. A stop ring 55 is also positioned in the valve cavity 35 between the valve body 33 and the front-end portion 78 of the socket 10. Seated within a circumferential groove of the stop ring 55 facing the front-end portion 78 of the socket 10 is a retaining ring 56. Further, the valve cavity 35 also contains a snap ring 54 positioned between the retaining ring 56 and a counter bore 52 of the socket 10. Preferably, the stop ring 55 is constructed of nitrile rubber while the retaining ring 56 and snap ring 54 are formed from a rigid material such as metal, stainless steel being a suitable material.

The assembly of the various components within the valve cavity 35 is best depicted in FIG. 2. As illustrated in FIG. 2, the valve cartridge 31 is inserted into the valve cavity 31 from the front-end portion 78 and through the bore 52 of the socket 10. After the valve cartridge 31 has been seated within the valve cavity 35, the stop ring 55 is positioned within a circumferential groove 57 of the valve cavity 35 with a retaining ring 56 then seated within the circumferential groove of the stop ring 55. While both the stop ring 55 and the retaining ring 56 assist in securing the valve cartridge 31 in the valve cavity 35, the retaining ring acts to lock all of the components in the valve cavity 35 into place. Thus, the valve cartridge 31 is precluded from becoming dislodged as a result of gas or fluid pressure at least as high as 3000 psi from a supply line connected to a rear-end portion 79 of the socket 10.

As further illustrated in FIG. 1, the counterbore 52 of the socket 10 is shaped to receive a mating plug 12. In order to secure the plug 12 within the socket 10, ball detents 20 are positioned in the counterbore 52 to engage the plug on insertion of the plug 12 into the socket 10. More specifically, ball detents 20 are positioned in ball-retaining apertures 21 along the circumference of the socket 10. The ball-retaining apertures 21 are tapered toward the bore 52 so that the balls 20 cannot enter the bore 52 by being urged into such a direction by a projecting shoulder 75 of detent sleeve 22. The detent sleeve 22 circumscribes the socket 10, holds the balls 20, and is movable axially for releasing the balls 20 from engagement with the projecting shoulder 75 and into an adjacent annular groove 77. A helical compression spring 87 coaxially surrounds the front-end portion 78 of the socket 10 and is positioned within a circumferential groove 76 of the sleeve 22. The sleeve 22 is limited in its axial movement by snap rings 85/86.

FIG. 2 illustrates that assembly of the sleeve 22 and balls 20 occurs after the components of the valve cartridge 35 have been fully assembled. Once the valve cartridge 35 is fully assembled the balls 20 are positioned within the ball-retaining apertures 21. Thereafter, the sleeve 22, in which the spring 87 is already positioned, can be attached to the socket 10 via snap rings 85/86.

FIG. 3 illustrates an exterior view of a fully assembled socket 10. Thus, the rear-end portion 79 includes the hex-fitting portion 83 to facilitate the attachment of a supply line (not illustrated). The front-end portion 78 of the socket 10 includes the detent sleeve 22 with a knurled or grooved surface 92 to facilitate grasping the sleeve 22. A user of the socket 10 can move the sleeve 22 in an axial direction to engage and disengage the plug 12 within the socket 10.

FIG. 4 illustrates a socket 10 coupled to the plug 12 to form an internal fluid-flow pathway 93 between the plug 12 and the socket 10 and the lines (not illustrated) that are attached thereto. The counterbore 52 of the socket 10 receives the mating plug 12 and is engaged by the balls 20 of the socket 10 as described above. The plug includes an annular shoulder 79 for urging the balls 20 radially outward when the plug 12 is being engaged by the socket 10 and an annular shoulder 81 for urging the balls 20 radially outward when the plug 12 is being disengaged by the socket 10. The plug 12 also includes an annular race 24 for receiving the balls 20 when the plug is engaged with the socket 10.

In operation, the plug 12 and socket 10 are connected in coupled relation by the plurality of balls 20 being urged in a radially outward direction by the annular shoulder 79 while the plug 12 is inserted into the bore 52 of the socket 10. As the plug 12 travels further into the bore 52, and the balls have cleared the annular shoulder 79, the balls 20 are then forced to engage the race 24 of the plug 12 by the shoulder 75 of the detent sleeve 22 upon axial movement of the detent sleeve towards the rear-end portion 79 of the socket 10. When the valve 26 is in the open position, the plug 12 forms a seal with the stop ring 55 to prevent leakage from the socket 10.

The socket 10 and plug 12 are disconnected by retracting the sleeve 22 on the socket 10 by axially moving the sleeve 22 on the socket 10 against the bias of the spring 87 and toward the end of the socket 10 away from the plug 12. The projecting shoulder 75 on the sleeve 22 moves out of engagement with the balls 20 and the ball-retaining apertures 21 and opens the groove 77 to receive the balls 20 when the plug 12 is pulled outwardly from the socket 10, thereby releasing the plug 12 from the socket 10.

The fluid-flow-flow pathway 93 of the socket 10 contains the valve 26 that is biased to close the fluid-flow-flow pathway 93 in the socket 10 when the plug 12 is disconnected from the socket 10. An o-ring washer 58 in a circumferential groove around the large diameter portion of the valve 26 engages the valve body 33 of the socket 10 to prevent fluid leakage when the plug 12 is disconnected from the socket 10.

FIG. 5 illustrates an exterior view of a fully assembled socket 10 engaged with a plug 12. The rear-end portions of both the socket 10 and plug 12 include a hex-fitting portion 83 to facilitate the attachment of a supply or discharge line (not illustrated). The front-end portion 78 of the socket 10 includes the detent sleeve 22 with a grooved surface 92 positioned to have the projecting shoulder 75 urge the balls 20 into the race 24 of the plug 12 and thereby coupling the socket 10 and plug 12 together.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fluid coupling for fluid conducting lines, said coupling comprising:

a generally cylindrical socket having a front-end portion and a rear-end portion with an axial fluid-flow pathway through the socket, the front-end portion for releasably engaging a mating member;

a valve cartridge mounted in a valve cavity from the front-end portion and along the fluid-flow pathway of the socket and operable to control an aperture along said fluid-flow pathway, said valve cartridge comprising a valve body, a valve member, and a valve spring, the valve member coaxially disposed within the valve body and the valve spring coaxially surrounding the valve member and disposed between the valve body and the valve member, the valve body including the aperture configured to allow the valve member to pass through the aperture; and a stop ring in the valve cavity disposed between the valve cartridge and the front-end portion to secure the valve cartridge in the valve cavity, wherein the stop ring is configured to substantially prevent movement of the valve body relative to the socket, and wherein the valve cavity includes a retaining ring disposed between the stop ring and the front-end portion to maintain the orientation of the stop ring.

2. The fluid coupling of claim 1, wherein the valve member includes a forward end proximate the stop ring and an opposite rear end including a valve.

3. The fluid coupling of claim 2, wherein the valve member is slidably mounted in the valve body.

4. The fluid coupling of claim 3, wherein the valve is urged against the valve body by the valve spring to close the fluid-flow pathway and the valve is capable of being separated from the valve body in response to pressure from the mating member against the forward end of the valve member thereby opening the fluid-flow pathway.

5. The fluid coupling of claim 2, wherein the valve includes an o-ring in a circumferential groove on the valve for precluding leakage between the valve member and the valve body when the fluid-flow pathway is closed.

6. The fluid coupling of claim 1, wherein the valve cavity includes a snap ring disposed between the retaining ring and the front-end portion to secure the valve cartridge, stop ring, and retaining ring in the valve cavity.

7. The fluid coupling of claim 6, wherein the valve cartridge, stop ring, retaining ring, and snap ring are configured to withstand at least 3,000 psi of pressure.

8. The fluid coupling of claim 1, wherein rear-end portion of the socket includes a hex fitting.

9. The fluid coupling of claim 1 wherein the stop ring is made of nitrile rubber.

10. A fluid coupling for fluid-conducting lines, comprising:
a first coupling member including a tubular body having an axial fluid-flow pathway therethrough and having a rear end for connection with a fluid conducting line and an opposite forward end for connection with a second coupling member, the first coupling member being configured such that the forward end of the second coupling member can be axially inserted into the forward end of the first coupling member for establishing a continuous fluid-flow pathway between the coupling members;
a valve assembly having a valve body, a valve member, and a valve spring configured to be slid into position as a unit through the forward end of the first coupling member, the valve member coaxially disposed within the valve body and the valve spring coaxially surrounding the valve member and disposed between the valve body and the valve member, the valve body including an aperture configured to allow the valve member to pass through the aperture, the valve member being moved axially upon insertion of the second coupling member into the first coupling member so as to open the fluid-flow pathway;
a circumferential groove defined in an inner surface of a valve cavity for receiving a stop ring to secure the valve assembly in the valve cavity and to limit the movement of the valve member towards the forward end of the first coupling member, wherein the stop ring is configured to substantially prevent movement of the valve body relative to the tubular body of the first coupling member; and
a hexagonal outer surface of the rear end of the first coupling member to facilitate connecting the fluid conducting line to the rear end of the first coupling member.

11. The fluid coupling of claim 10, wherein the valve member includes a forward end proximate the stop ring and an opposite rear end including a valve.

12. The fluid coupling of claim 11, wherein the valve is urged against the valve body by the valve spring to close the fluid-flow pathway when the second coupling member is removed from the first coupling member.

13. The fluid coupling of claim 11, wherein the valve includes an o-ring in a circumferential groove on the valve for precluding leakage between the valve member and the valve body when the fluid-flow pathway is closed.

14. The fluid coupling of claim 10, wherein the valve cavity includes a retaining ring disposed between the stop ring and the forward end of the first coupling member to maintain the orientation of the stop ring.

15. The fluid coupling of claim 14, wherein the valve cavity includes a snap ring disposed between the retaining ring and the forward end of the first coupling member to secure the valve assembly, stop ring, and retaining ring in the valve cavity.

16. The fluid coupling of claim 15, wherein the valve assembly, stop ring, retaining ring, and snap ring are configured to withstand at least 3,000 psi of pressure.

17. The coupling of claim 10 wherein the stop ring is made of nitrile rubber.

* * * * *

UNITED STATES PATENT AND TRADEMARK OFFICE
CERTIFICATE OF CORRECTION

PATENT NO.         : 8,191,932 B2
APPLICATION NO.    : 12/357799
DATED              : June 5, 2012
INVENTOR(S)        : Davis Page 1 of 1

It is certified that error appears in the above-identified patent and that said Letters Patent is hereby corrected as shown below:

Column 2,
Line 36, "nitrite" should read --nitrile--.

Signed and Sealed this
Twelfth Day of March, 2013

Teresa Stanek Rea
*Acting Director of the United States Patent and Trademark Office*